United States Patent
Onishi et al.

(10) Patent No.: US 11,895,039 B2
(45) Date of Patent: Feb. 6, 2024

(54) SCALABLE DATA FLOWS IN A COMMUNICATION NETWORK

(71) Applicants: NEC CORPORATION, Tokyo (JP); NATIONAL INSTITUTE OF INFORMATION AND COMMUNICATIONS TECHNOLOGY, Tokyo (JP)

(72) Inventors: Takeo Onishi, Tokyo (JP); Taketoshi Nakajima, Tokyo (JP); Toru Osuga, Tokyo (JP); Satoko Itaya, Tokyo (JP); Kenichi Maruhashi, Tokyo (JP); Fumihide Kojima, Tokyo (JP)

(73) Assignees: NEC CORPORATION, Tokyo (JP); NATIONAL INSTITUTE OF INFORMATION AND COMMUNICATION TECHNOLOGY, Koganei (JP)

( * ) Notice: Subject to any disclaimer, the term of this patent is extended or adjusted under 35 U.S.C. 154(b) by 3 days.

(21) Appl. No.: 17/641,885

(22) PCT Filed: Sep. 9, 2020

(86) PCT No.: PCT/JP2020/034101
§ 371 (c)(1),
(2) Date: Mar. 10, 2022

(87) PCT Pub. No.: WO2021/049526
PCT Pub. Date: Mar. 18, 2021

(65) Prior Publication Data
US 2022/0329538 A1    Oct. 13, 2022

(30) Foreign Application Priority Data
Sep. 12, 2019   (JP) .................... 2019-166067

(51) Int. Cl.
*H04L 1/00* (2006.01)
*H04L 47/762* (2022.01)
*H04L 43/0894* (2022.01)

(52) U.S. Cl.
CPC ........ *H04L 47/762* (2013.01); *H04L 43/0894* (2013.01)

(58) Field of Classification Search
CPC ....... H04L 12/28; H04L 43/16; H04L 47/762; H04L 43/0852
See application file for complete search history.

(56) References Cited

U.S. PATENT DOCUMENTS 7,289,514 B2 * 10/2007 Robotham ............ H04L 47/762
370/230.1
11,153,214 B2 * 10/2021 Pathikonda ............ H04L 45/16
(Continued)

FOREIGN PATENT DOCUMENTS

| JP | 2008-301413 A | 12/2008 |
| JP | 2014-502446 A | 1/2014 |
| WO | 2018/147285 A1 | 8/2018 |

OTHER PUBLICATIONS

IEEE Std 802.1Q-2018, "IEEE Standard for Local and Metropolitan Area Networks-Bridges and Bridged Networks", pp. 1-1993.
(Continued)

*Primary Examiner* — Abdelnabi O Musa
(74) *Attorney, Agent, or Firm* — Sughrue Mion, PLLC

(57) ABSTRACT

A communication system according to the present disclosure includes: a required band calculation unit (12, 41) configured to calculate a required band for a plurality of flows received by a bridge apparatus (3), in which, for a flow including burst data among the plurality of flows, the required band calculation unit (12, 41) calculates the required band for the flow based on a data size of the burst data and an allowable delay of the flow; and a speed ratio
(Continued)

calculation unit (32, 43) configured to calculate a relative ratio of communication speeds of the plurality of flows based on the required band for the plurality of flows. The bridge apparatus (3) transfers the plurality of flows to a data receiving apparatus (2) according to the relative ratio of the communication speeds.

15 Claims, 14 Drawing Sheets

(56) References Cited

U.S. PATENT DOCUMENTS

| | | | |
|---|---|---|---|
| 11,463,370 B2* | 10/2022 | Francini | H04L 47/56 |
| 2011/0158093 A1* | 6/2011 | Hirasawa | H04L 47/28 |
| | | | 370/230 |
| 2012/0106342 A1* | 5/2012 | Sundararajan | H04L 47/10 |
| | | | 370/235 |
| 2016/0301612 A1* | 10/2016 | Hassidim | H04L 47/125 |
| 2020/0028605 A1* | 1/2020 | Uzawa | H04L 47/28 |

OTHER PUBLICATIONS

Hideyuki Shimonishi et al., "An Improvement of Weighted Round Robin Cell Scheduling in ATM Networks", in Proc of IEEE Globecom'97, Nov. 1997, pp. 1119-1123, vol. 2, Phoenix, AZ, USA.

Chuck Semeria, "Supporting Differentiated Service Classes: Queue Scheduling Disciplines, " White Paper, Juniper Networks, Inc., 2001, pp. 1-27.

International Search Report of PCT/JP2020/034101 dated Dec. 15, 2020 [PCT/ISA/210].

* cited by examiner

| TRAFFIC | DATA SIZE | FREQUENCY OF COMMUNICATIONS | ALLOWABLE DELAY | NUMBER OF FLOWS | REQUIRED BAND (WITHOUT CORRECTION AMOUNT) |
|---|---|---|---|---|---|
| A (INSPECTION IMAGE) | 5MB | 1/10s | 5sec | 2 | 8Mbps (5MB/5sec) |
| B (WIRELESS TOOL) | 150KB | 1/s | 300msec | 4 | 4Mbps (150KB/300msec) |

Fig. 10

| | REQUIRED BAND (WITH CORRECTION AMOUNT) | RATIO OF COMMUNICATION SPEED | RATIO OF COMMUNICATION SPEED (TORAL) |
|---|---|---|---|
| PRIORITIZED TRAFFIC A | 8 + 0.4 Mbps (+5%) | 15.6% | 69.6% |
| | 8 + 0.4 Mbps | 15.6% | |
| PRIORITIZED TRAFFIC B | 4 + 1.2 Mbps (+30%) | 9.6% | |
| | 4 + 1.2 Mbps | 9.6% | |
| | 4 + 1.2 Mbps | 9.6% | |
| | 4 + 1.2 Mbps | 9.6% | |
| BEST-EFFORT TRAFFIC | (16.4 Mbps) | 30.4% | 30.4% |

Fig. 11

SCALABLE DATA FLOWS IN A COMMUNICATION NETWORK

CROSS REFERENCE TO RELATED APPLICATIONS

This application is a National Stage of International Application No. PCT/JP2020/034101, filed Sep. 9, 2020, claiming priority to Japanese Patent Application No. 2019-166067, filed Sep. 12, 2019, the contents of which are incorporated herein by reference.

TECHNICAL FIELD

The present disclosure relates to a communication system, a bridge apparatus, a communication method, and a non-transitory computer readable medium, and in particular to a communication system, a bridge apparatus, a communication method, and a non-transitory computer readable medium that satisfy communication requirements (e.g., communication bands, allowable delays, etc.) for flows of data and realize stable communication in facilities such as factories and warehouses.

BACKGROUND ART

In facilities such as factories and warehouses in which there are a large number of sensors, cameras, and the like in a mixed fashion, communication systems in which a variety of networks including wireless LANs (Local Area Networks) are constructed have been being introduced. Networks constructed in a communication system are not a single network, but are often operated independently of each other because they are introduced for different purposes and at different times. Therefore, such networks constructed in a communication system are not equipped with mechanisms for cooperating with each other, thus making it difficult to efficiently use radio frequencies. Examples of communication nodes in such networks installed in factories include transmitters/receivers, switches, bridges, and routers. A number of flows of data which originate from a plurality of applications and for which communication requirements are different come to these communication nodes, and these flows of data are transferred therefrom to other communication nodes through networks. Each of these flows has a different priority.

Non-patent Literature 1 discloses a technique for allocating communication bands to a plurality of flows for which communication requirements are different. Non-patent Literature 1 discloses a technique (a credit-based shaper algorithm) in which a predetermined ratio of communication bands is allocated to flows having high priorities among a plurality of flows. In the technique disclosed in Non-patent Literature 1, an index called a credit is defined for each communication port, and the credit values are controlled so that the credit value of a communication port through which flows having high priorities are transferred is maintained within a predetermined range. By doing so, the ratio of the communication bands for the flows having high priorities can be kept at a predetermined ratio.

Further, in an environment where there are a variety of flows in a mixed fashion, it may not be possible to assign mutually different priorities to all the flows, so that the same priority may be assigned to a plurality of flows. In such an environment, in the case of the technique disclosed in Non-patent Literature 1, there is a problem that it is impossible to take differences in detailed communication requirements among flows having the same priority into consideration. As a solution to this problem, there are techniques disclosed in Non-patent Literatures 2 and 3. In the techniques disclosed in Non-patent Literatures 2 and 3, when a plurality of flows are held in the same transmission queue, different weights are assigned to the plurality of flows and communication bands are allocated to the flows according to the weights, thus making it possible to satisfy communication requirements for a larger number of flows.

CITATION LIST

Non Patent Literature

Non-patent Literature 1: IEEE Std 802.1Q—2018 IEEE Standard for Local and Metropolitan Area Networks—Bridges and Bridged Networks, pages 1938-1942.
Non-patent Literature 2: H. Shimonishi, M. Yoshida, R. Fan, and H. Suzuki, "An Improvement of Weighted Round Robin Cell Scheduling in ATM Networks," in Proc of IEEE Globecom'97, vol. 2, pp. 1119-1123, Phoenix, AZ, USA, Nov. 1997.
Non-patent Literature 3: C. Semeria, "Supporting Differentiated Service Classes: Queue Scheduling Disciplines," White Paper, Juniper Networks, Inc., 2001.

SUMMARY OF INVENTION

Technical Problem

It should be noted that, video data, data of a large-volume content, and the like are data that are transmitted over a long period of time and dominantly affect the communication band. The techniques disclosed in Non-patent Literatures 1 to 3 can make it possible, in an environment where such data is transmitted through a communication path such as a wired network in which available bands rarely change, to appropriately allocate communication bands to a plurality of flows.

Meanwhile, in facilities such as factories and warehouses, a number of data such as information detected by various sensors and control messages to robots and the like are transmitted. Such data is burst data that does not require a steady communication band, but instantaneously requires a communication band in order to satisfy a short allowable delay. For example, sensors generate communication including burst data in an uplink at arbitrary timings, so flows are instantaneously concentrated. Further, communication paths constructed in such facilities are wireless networks in which available bands change (increase or decrease).

However, in the techniques disclosed in Non-patent Literature 1 to 3, wireless networks in which available bands frequently change are not taken into consideration. Further, allowable delays of burst data is often short, and therefore, unlike video data, changes in the band of such burst data cannot be absorbed by buffers. As a result, when the communication band required for the transfer of burst data (hereinafter referred to as the required band) is not satisfied, the allowable delay immediately becomes unsatisfied. However, the techniques disclosed in Non-patent Literatures 1 to 3 do not provide any means for, in order to satisfy the allowable delays of a plurality of flows including burst data in such an environment, appropriately calculating the required band for the flows and controlling the communication speed of each flow.

Therefore, an object of the present disclosure is to solve the above-described problem, and to provide a communication system, a bridge apparatus, a communication method, and a non-transitory computer readable medium capable of satisfying communication requirements for flows including burst data in an environment where burst data is transmitted through a communication path in which the available band frequently changes.

Solution to Problem

A communication system according to an aspect includes:
at least one data transmitting apparatus;
at least one data receiving apparatus;
at least one bridge apparatus connected to the data transmitting apparatus and the data receiving apparatus through a communication path, and configured to receive a plurality of flows from the data transmitting apparatus and transfer the plurality of flows to the data receiving apparatus;
a required band calculation unit configured to calculate a required band for the plurality of flows, in which, for a flow including burst data among the plurality of flows, the required band calculation unit calculates the required band for the flow based on a data size of the burst data and an allowable delay of the flow; and
a speed ratio calculation unit configured to calculate a relative ratio of communication speeds of the plurality of flows based on the required band for the plurality of flows, in which
the bridge apparatus transfers the plurality of flows to the data receiving apparatus according to the relative ratio of the communication speeds.

A bridge apparatus according to an aspect is a bridge apparatus connected to at least one data transmitting apparatus and at least one data receiving apparatus through a communication path, and configured to receive a plurality of flows from the data transmitting apparatus and transfer the plurality of flows to the data receiving apparatus, the bridge apparatus including:
a speed ratio calculation unit configured to be notified of a required band for the plurality of flows, and to calculate a relative ratio of communication speeds of the plurality of flows based on the required band for the plurality of flows; and
a data transfer unit configured to receive the plurality of flows from the data transmitting apparatus and transfer the plurality of flows to the data receiving apparatus according to the relative ratio of the communication speeds, in which
the required band for a flow including burst data among the plurality of flows is calculated based on a data size of the burst data and an allowable delay of the flow.

A communication method according to an aspect is a communication method performed by a communication system including: at least one data transmitting apparatus; at least one data receiving apparatus; and at least one bridge apparatus connected to the data transmitting apparatus and the data receiving apparatus through a communication path, and configured to receive a plurality of flows from the data transmitting apparatus and transfer the plurality of flows to the data receiving apparatus,
the communication method including:
a step of calculating a required band for the plurality of flows, in which, for a flow including burst data among the plurality of flows, the required band for the flow is calculated based on a data size of the burst data and an allowable delay of the flow;
a step of calculating a relative ratio of communication speeds of the plurality of flows based on the required band for the plurality of flows; and
a step of transferring, by the bridge apparatus, the plurality of flows to the data receiving apparatus according to the relative ratio of the communication speeds.

A communication method according to an aspect is a communication method performed by a bridge apparatus connected to at least one data transmitting apparatus and at least one data receiving apparatus through a communication path, and configured to receive a plurality of flows from the data transmitting apparatus and transfer the plurality of flows to the data receiving apparatus,
the communication method including:
a step of being notified of a required band for the plurality of flows, and calculating a relative ratio of communication speeds of the plurality of flows based on the required band for the plurality of flows; and
a step of receiving the plurality of flows from the data transmitting apparatus and transferring the plurality of flows to the data receiving apparatus according to the relative ratio of the communication speeds, in which
the required band for a flow including burst data among the plurality of flows is calculated based on a data size of the burst data and an allowable delay of the flow.

A non-transitory computer readable medium according to an aspect is a non-transitory computer readable medium storing a program to be executed by a bridge apparatus connected to at least one data transmitting apparatus and at least one data receiving apparatus through a communication path, and configured to receive a plurality of flows from the data transmitting apparatus and transfer the plurality of flows to the data receiving apparatus,
the program including:
a process for being notified of a required band for the plurality of flows, and calculating a relative ratio of communication speeds of the plurality of flows based on the required band for the plurality of flows; and
a process for receiving the plurality of flows from the data transmitting apparatus and transferring the plurality of flows to the data receiving apparatus according to the relative ratio of the communication speeds, in which
the required band for a flow including burst data among the plurality of flows is calculated based on a data size of the burst data and an allowable delay of the flow.

Advantageous Effects of Invention

According to the above-described aspect, it is possible to obtain an advantageous effect that it is possible to provide a communication system, a bridge apparatus, a communication method, and a non-transitory computer readable medium capable of satisfying communication requirements for flows including burst data in an environment where burst data is transmitted through a communication path in which the available band frequently changes.

BRIEF DESCRIPTION OF DRAWINGS

FIG. 10 shows an example of flow characteristics and communication requirements for showing advantageous effects of a communication system according to the fifth example embodiment;

FIG. 11 shows an example of control performed by the communication system according to the fifth example embodiment in a case where correction amounts corresponding to allowable delays are added to required bands;

DESCRIPTION OF EMBODIMENTS

Example embodiments according to the present disclosure will be described hereinafter with reference to the drawings. Note that, for clarifying the explanation, the following descriptions and the drawings are partially omitted and simplified as appropriate. Further, the same symbols are assigned to the same elements throughout the drawings, and redundant explanations are omitted as appropriate.

First Example Embodiment

Firstly, an example of a configuration of a communication system according to a first example embodiment will be described with reference to FIG. 1. Note that, in FIG. 1, unidirectional arrows indicate the directions of flows of certain signals (data) in a straightforward manner, and they are not intended to exclude bidirectionality thereof (the same applies to FIGS. 6, 8 and 14 described later).

Figure 1:
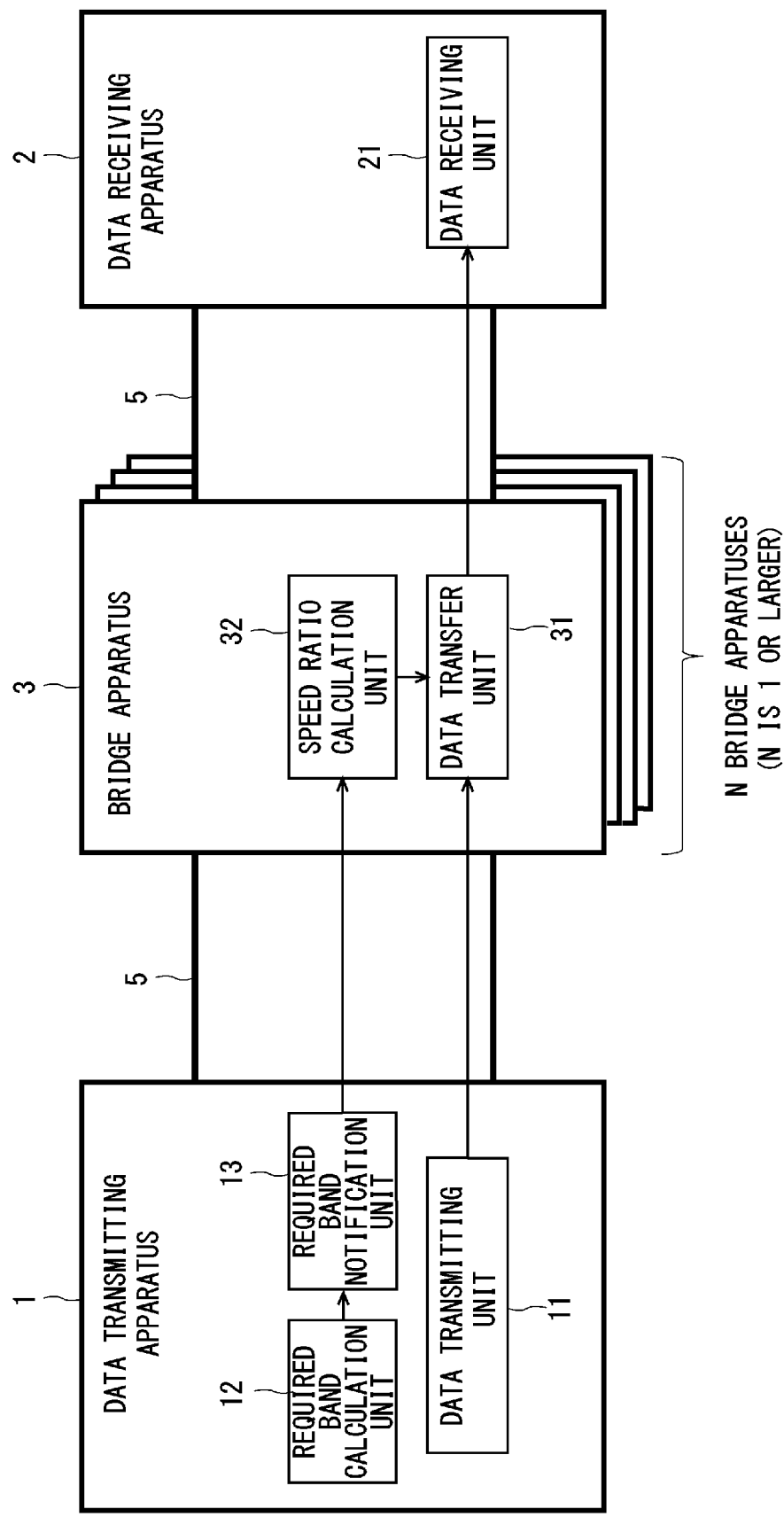
FIG. 1 is a block diagram showing an example of a configuration of a communication system according to a first example embodiment.

Referring to FIG. 1, the communication system according to the first example embodiment includes a data transmitting apparatus 1, a data receiving apparatus 2, and bridge apparatuses 3, and they are connected to each other through a communication path 5. Note that it is assumed the communication path 5 is a wireless network, and therefore the available band in the communication path 5 changes. Further, even if the communication path 5 is a wired network, the available communication band in the communication path 5 changes when the communication path 5 is also used for communication with other entities. Further, N bridge apparatuses 3 (N is an integer equal to or greater than one) are provided. Further, although only one data transmitting apparatus 1 and one data receiving apparatus 2 are provided in FIG. 1, two or more data transmitting apparatuses 1 and/or two or more data receiving apparatuses 2 may be provided.

The data transmitting apparatus 1 includes a data transmitting unit 11, a required band calculation unit 12, and a required band notification unit 13. The data transmitting unit 11 transmits flows of data. The required band calculation unit 12 calculates required bands, i.e., communication bands required to transfer the flows transmitted from the data transmitting unit 11. The required band notification unit 13 notifies the bridge apparatuses 3 of the required band calculated by the required band calculation unit 12.

Each of the bridge apparatuses 3 includes a data transfer unit 31 and a speed ratio calculation unit 32. The data transfer unit 31 receives a plurality of flows from the data transmitting apparatus 1 and other bridge apparatuses 3. The speed ratio calculation unit 32 calculates a relative ratio of communication speeds of the plurality of flows based on the required bands for the plurality of flows. The data transfer unit 31 transfers the plurality of flows to the data receiving apparatus 2 according to the relative ratio of the communication speeds of the plurality of flows.

The data receiving apparatus 2 includes a data receiving unit 21. The data receiving unit 21 receives a plurality of flows from the bridge apparatuses 3.

Next, an example of operations performed by the communication system according to the first example embodiment will be described with reference to FIG. 2.

Figure 2:
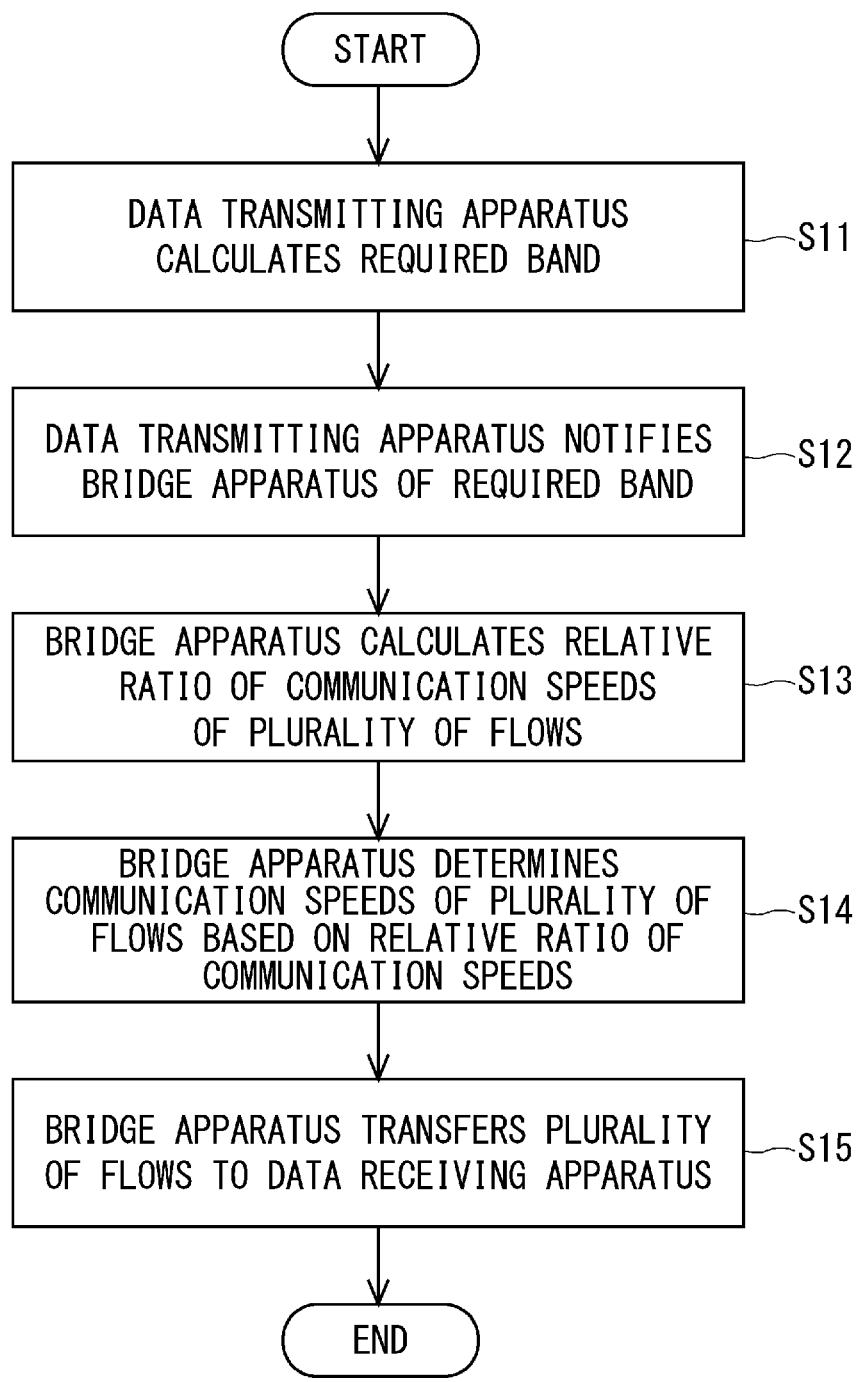
FIG. 2 is a flowchart showing an example of operations performed by the communication system according to the first example embodiment.

Referring to FIG. 2, in the data transmitting apparatus 1, the data transmitting unit 11 transmits flows of data to the data transfer unit 31 of the bridge apparatus 3, and the required band calculation unit 12 calculates required bands for the flows transmitted from the data transmitting unit 11 (S11). Note that, for flows including burst data, the required band calculation unit 12 calculates required bands therefor based on, for example, the data size of the burst data and the allowable delays of the flows, which are obtained by other means (S11). This calculation is performed, for example, by dividing the data size by the allowable delay. Meanwhile, for flows including no burst data, for example, flows including continuous data such as data of video streaming, the required band calculation unit 12 can use, for example, the average data rate of the continuous data as the required band. The required band notification unit 13 notifies the speed ratio calculation unit 32 of the bridge apparatus 3 of the calculation result of the required band calculated by the required band calculation unit 12 (S12).

In the bridge apparatus 3, the data transfer unit 31 receives a plurality of flows from the data transmitting apparatus 1 and other bridge apparatuses 3. The speed ratio calculation unit 32 calculates a relative ratio of communication speeds of the plurality of flows based on the required bands for the plurality of flows received by the data transfer unit 31 (S13). The data transfer unit 31 determines the communication speeds of the plurality of flows so that the relative ratio of the communication speeds of the plurality of flows is maintained (S14). Then, the data transfer unit 31 transfers the plurality of flows to the data receiving unit 21 of the data receiving apparatus 2 at the determined communication speeds (S15).

According to the first example embodiment, the required band calculation unit 12 calculates required bands for flows including burst data among a plurality of flows based on the data size of the burst data and the allowable delays of the flows. The speed ratio calculation unit 32 calculates the relative ratio of communication speeds of the plurality of flows based on the required bands for the plurality of flows. The data transfer unit 31 transfers the plurality of flows according to the relative ratio of the communication speeds. In this way, it is possible to obtain an advantageous effect that, in a facility where a variety of burst data is transmitted through the communication path 5, communication requirements (allowable delays) for flows including burst data can be satisfied even when the available band in the communication path 5 is reduced.

Advantageous effect of the first example embodiment will be described in a specific manner with reference to FIGS. 3 to 5.

Figure 3:
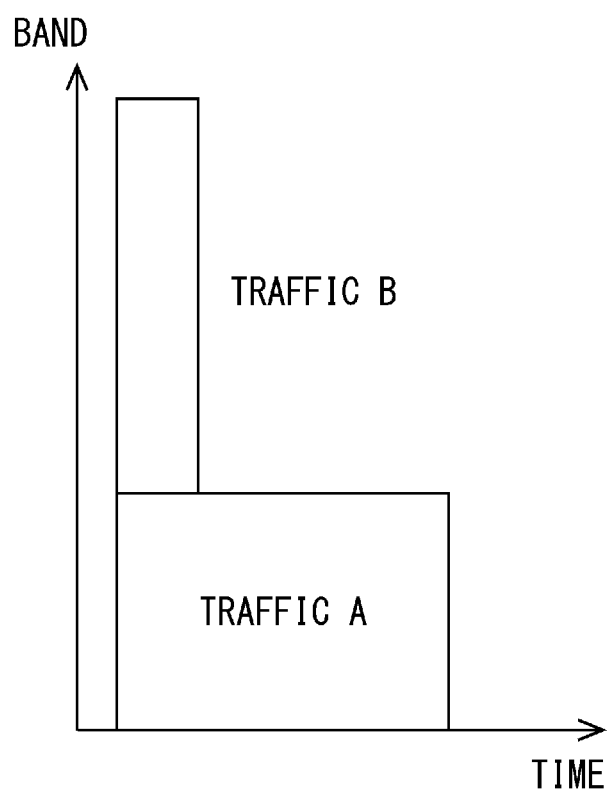
FIG. 3 is a diagram for explaining an example of band allocation performed by the communication system according to the first example embodiment in a case where there is a sufficient available band in a communication path.
Figure 4:
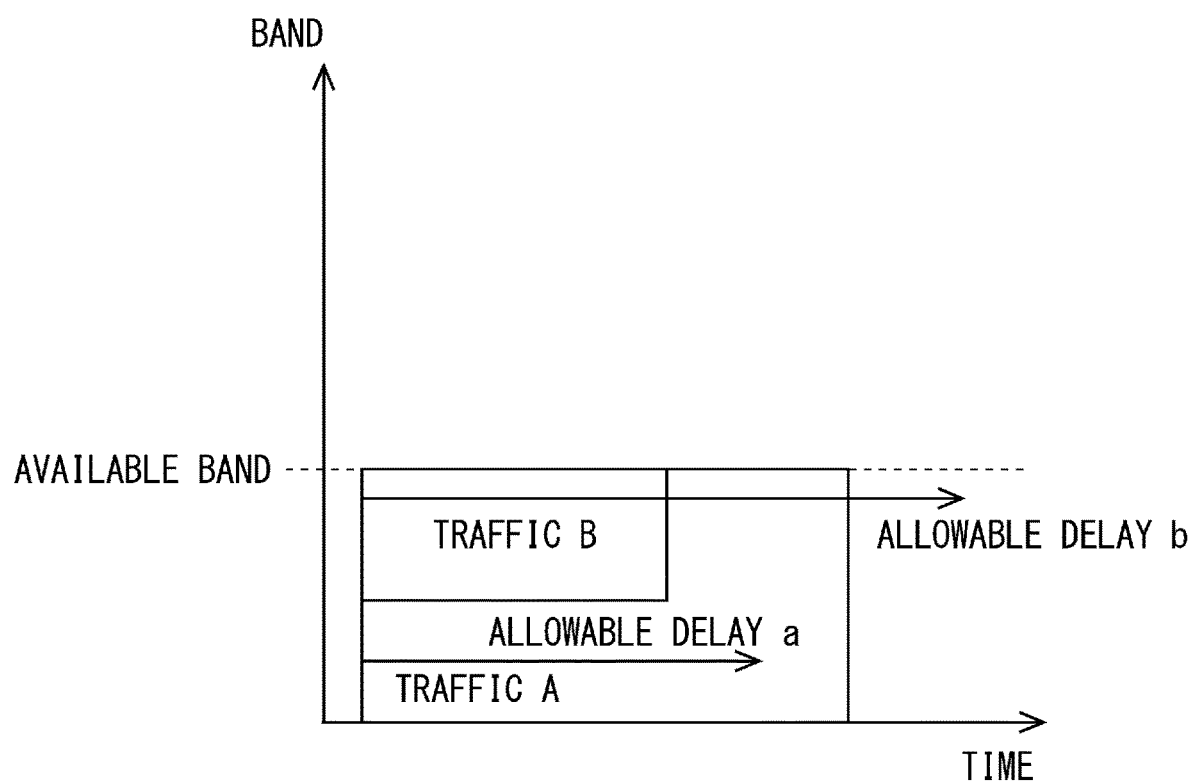
FIG. 4 is a diagram for explaining an example of band allocation performed by the communication system according to related art in a case where the available band in a communication path is reduced.
Figure 5:
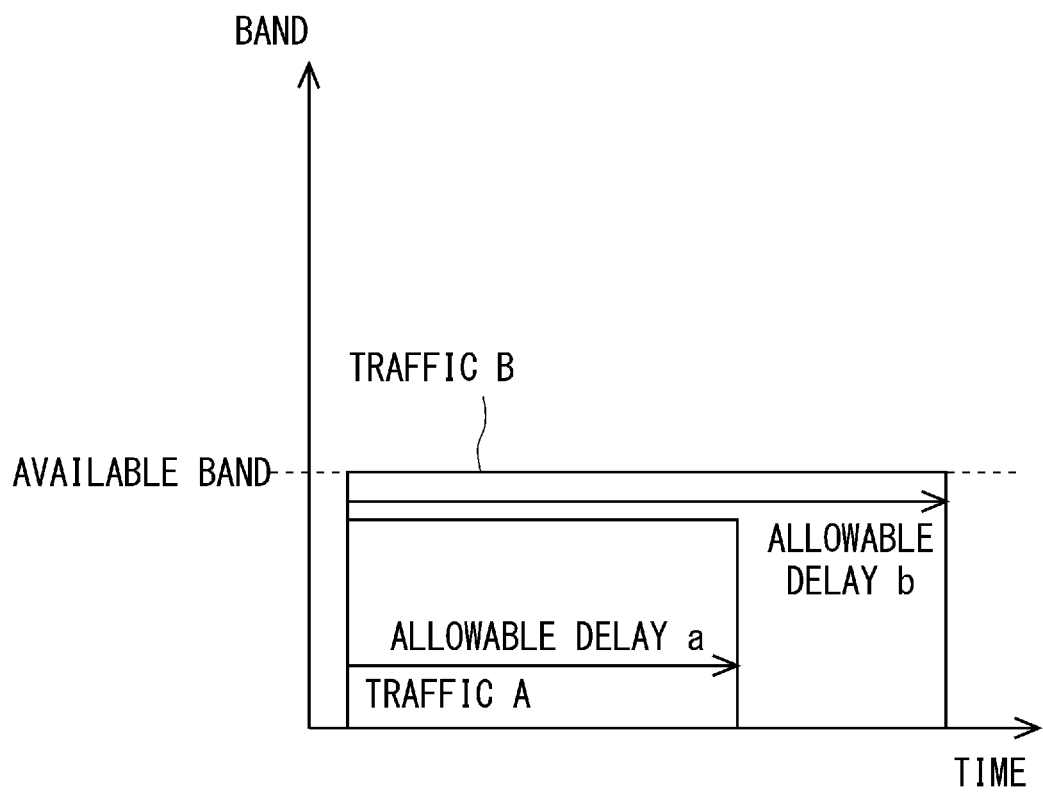
FIG. 5 is a diagram for explaining an example of band allocation performed by the communication system according to the first example embodiment in a case where the available band of the communication path is reduced.

FIGS. 3 to 5 show examples of band allocation for two flows including burst data received by the bridge apparatus 3. Note that the traffics (the types of communication) of the two flows are referred to as a traffic A (an allowable delay a) and a traffic B (an allowable delay b), respectively.

FIG. 3 is an example of a case where there is a sufficient available band in the communication path 5 from the bridge apparatus 3 to the data receiving apparatus 2. In the example shown in FIG. 3, no data is accumulated in the bridge apparatus 3, so no delay occurs due to accumulation. As a result, the two flows of the traffics A and B can satisfy the allowable delays a and b, respectively.

FIG. 4 shows an example in which two flows are transferred according to related art when the available band in the communication path 5 from the bridge apparatus 3 to the data receiving apparatus 2 is reduced. When the available band in the communication path 5 is reduced, the amount of data accumulated in the bridge apparatus 3 increases, so the delays of the two flows of the traffics A and B increase. As a result, in the example shown in FIG. 4, the delay of the flow of the traffic A exceeds the allowable delay a.

FIG. 5 shows an example in which two flows are transferred according to the first example embodiment when the available band in the communication path 5 from the bridge apparatus 3 to the data receiving apparatus 2 is reduced. In the first example embodiment, the required bands for the two flows of the traffics A and B are calculated by using the allowable delays a and b, respectively. Further, the relative ratio of communication speeds of the two flows is calculated based on the calculated required bands, and the two flows are transferred according to the relative ratio of the communication speeds. Therefore, it is possible to reduce the required band for the flow of the traffic B, which has a margin in the allowable delay, and to relatively increase the communication speed of the flow of the traffic A. As a result, the two flows of the traffics A and B can satisfy the allowable delays a and b, respectively.

Note that as a method for maintaining the relative ratio of the communication speeds of the two flows of the traffics A and B when the available band in the communication path 5 dynamically changes, there are two conceivable methods shown below.

(1) After the required bands for the two flows of the traffics A and B are secured, control is performed so that the remaining band is allocated for the traffics having other priorities.

(2) Control is performed so that the required bands that are secured for the two flows of the traffics A and B have relative ratios equal to each other according to the available band in the communication path 5.

Both of the above-described two methods can provide the advantageous effects of the first example embodiment.

The above-described method (1) is relatively easily implemented by using the band control disclosed in Non-patent literature 1. In this case, the remaining band is adjusted according to the available band in the communication path 5. Note that when another relay apparatus(es) (not shown) is provided between the bridge apparatus 3 and the data receiving apparatus 2, the relay apparatus adjusts the remaining band according to the available band after the required bands for the two flows of the traffics A and B are secured.

The above-described method (2) makes it possible to provide a margin (a correction amount) in the required band when there is a margin in the available band in the communication path 5. Therefore, it is possible to perform communication with a margin in the delay.

Second Example Embodiment

Next, an example of a configuration of a communication system according to a second example embodiment will be described with reference to FIG. 6.

Figure 6:
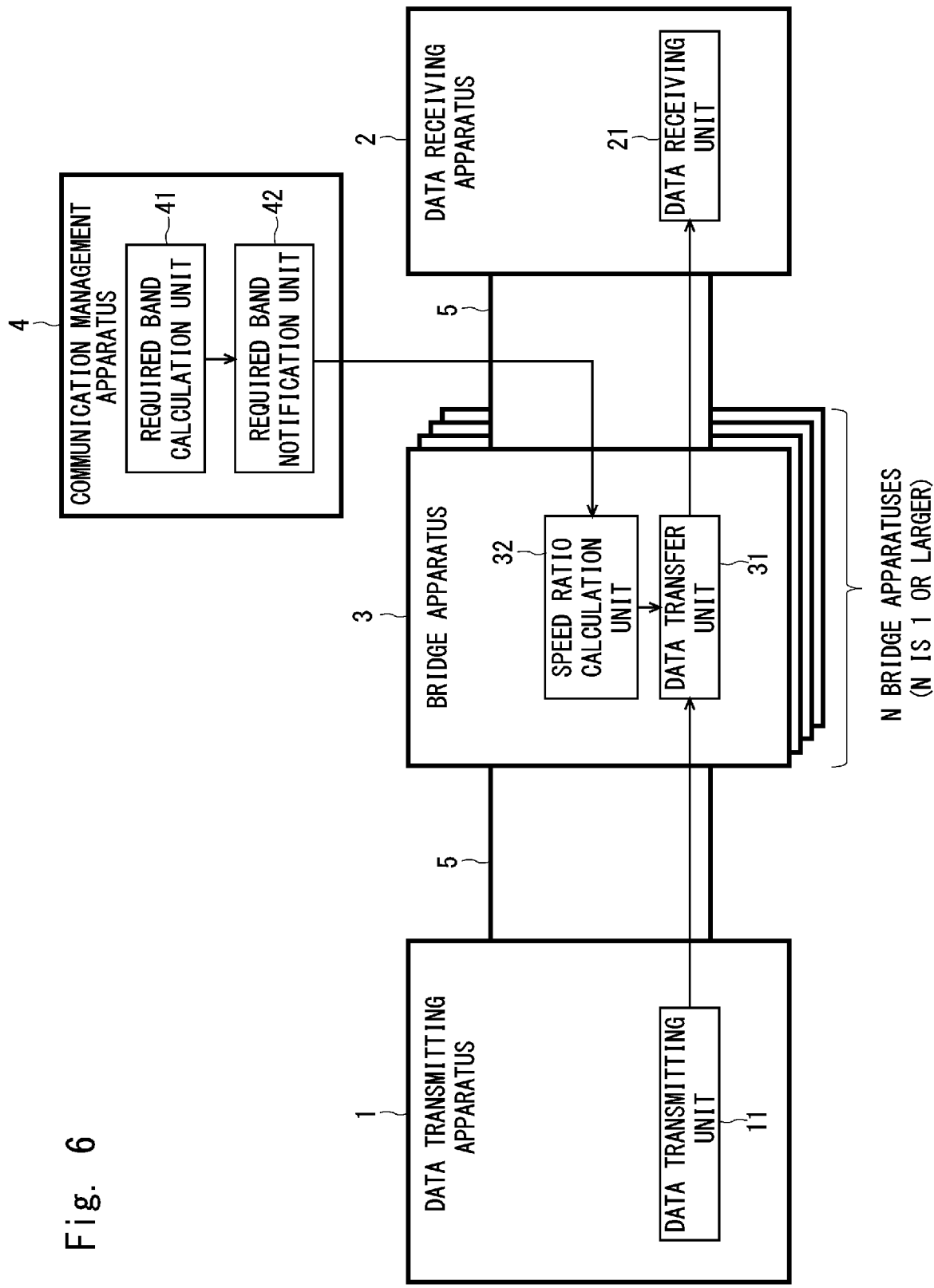
FIG. 6 is a block diagram showing an example of a configuration of a communication system according to a second example embodiment.

Referring to FIG. 6, the communication system according to the second example embodiment differs from the above-described first example embodiment because the required band calculation unit 12 and the required band notification unit 13 are removed from the data transmitting apparatus 1, and a communication management apparatus 4 including a required band calculation unit 41 and a required band notification unit 42 is added therein.

The communication management apparatus 4 is connected to at least the bridge apparatuses 3. The required band calculation unit 41 calculates required bands for flows of data transmitted from the data transmitting apparatus 1. The required band notification unit 42 notifies the bridge apparatuses 3 of the required bands calculated by the required band calculation unit 41.

Note that the second example embodiment has a configuration similar to that of the first example embodiment, except for the above-described configuration.

Next, an example of operations performed by the communication system according to the second example embodiment will be described with reference to FIG. 7.

Figure 7:
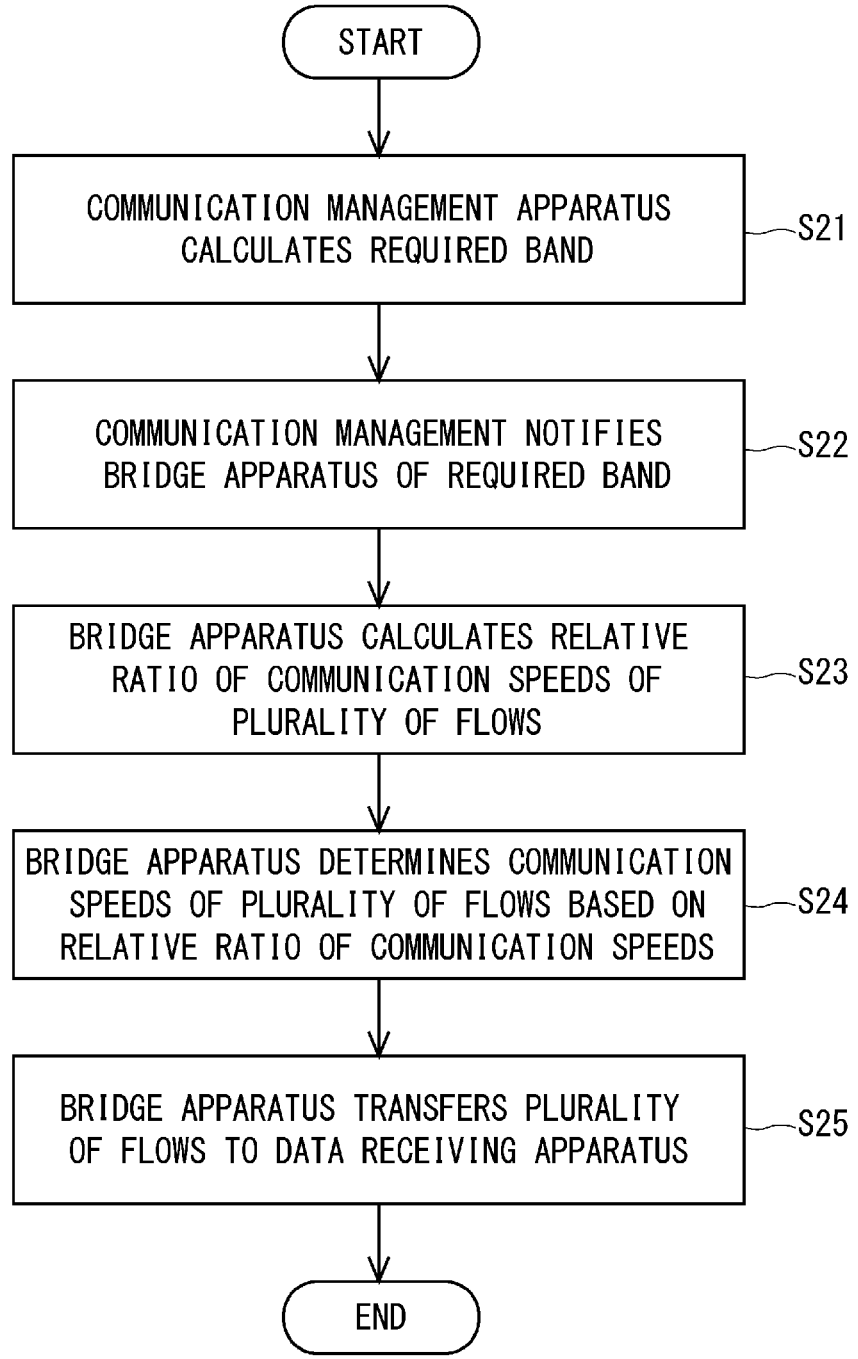
FIG. 7 is a flowchart showing an example of operations performed by the communication system according to the second example embodiment.

Referring to FIG. 7, in the data transmitting apparatus 1, the data transmitting unit 11 transmits flows to the data transfer unit 31 of the bridge apparatus 3.

In the communication management apparatus 4, the required band calculation unit 41 calculates required bands for the flows transmitted from the data transmitting unit 11 of the data transmitting apparatus 1 in a manner similar to that of the required band calculation unit 12 in the above-described first example embodiment (S21). The required band notification unit 42 notifies the speed ratio calculation unit 32 of the bridge apparatus 3 of the calculation result of the required bands calculated by the required band calculation unit 41 (S22).

In the bridge apparatus 3, the data transfer unit 31 receives a plurality of flows from the data transmitting apparatus 1 and other bridge apparatuses 3. The speed ratio calculation unit 32 calculates a relative ratio of communication speeds of the plurality of flows based on the required bands for the plurality of flows received by the data transfer unit 31 (S23). The data transfer unit 31 determines the communication speeds of the plurality of flows so that the relative ratio of the communication speeds of the plurality of flows is maintained (S24). Then, the data transfer unit 31 transfers the plurality of flows to the data receiving unit 21 of the data receiving apparatus 2 at the determined communication speeds (S25).

In the previously-described first example embodiment, the required band calculation unit 12 and the required band notification unit 13, which perform the calculation and notification of the required bands for flows, are disposed in the data transmitting apparatus 1.

In contrast, in the second example embodiment, the required band calculation unit 41 and the required band notification unit 42, which have functions similar to those of the required band calculation unit 12 and the required band notification unit 13, respectively, are disposed in the communication management apparatus 4. The second example embodiment differs from the first example embodiment only in this point.

Therefore, the second example embodiment provides advantageous effects similar to those of the above-described first example embodiment.

Further, in the second example embodiment, since the required band calculation unit 41 is disposed in the communication management apparatus 4, the flows can be managed in the communication management apparatus 4 in a centralized manner. As a result, it becomes easier to manage all the flows in the communication system, and it is possible to reduce the hardware resources and the processing time of the data transmitting apparatus 1.

Third Example Embodiment

Next, an example of a configuration of a communication system according to a third example embodiment will be described with reference to FIG. 8.

Figure 8:
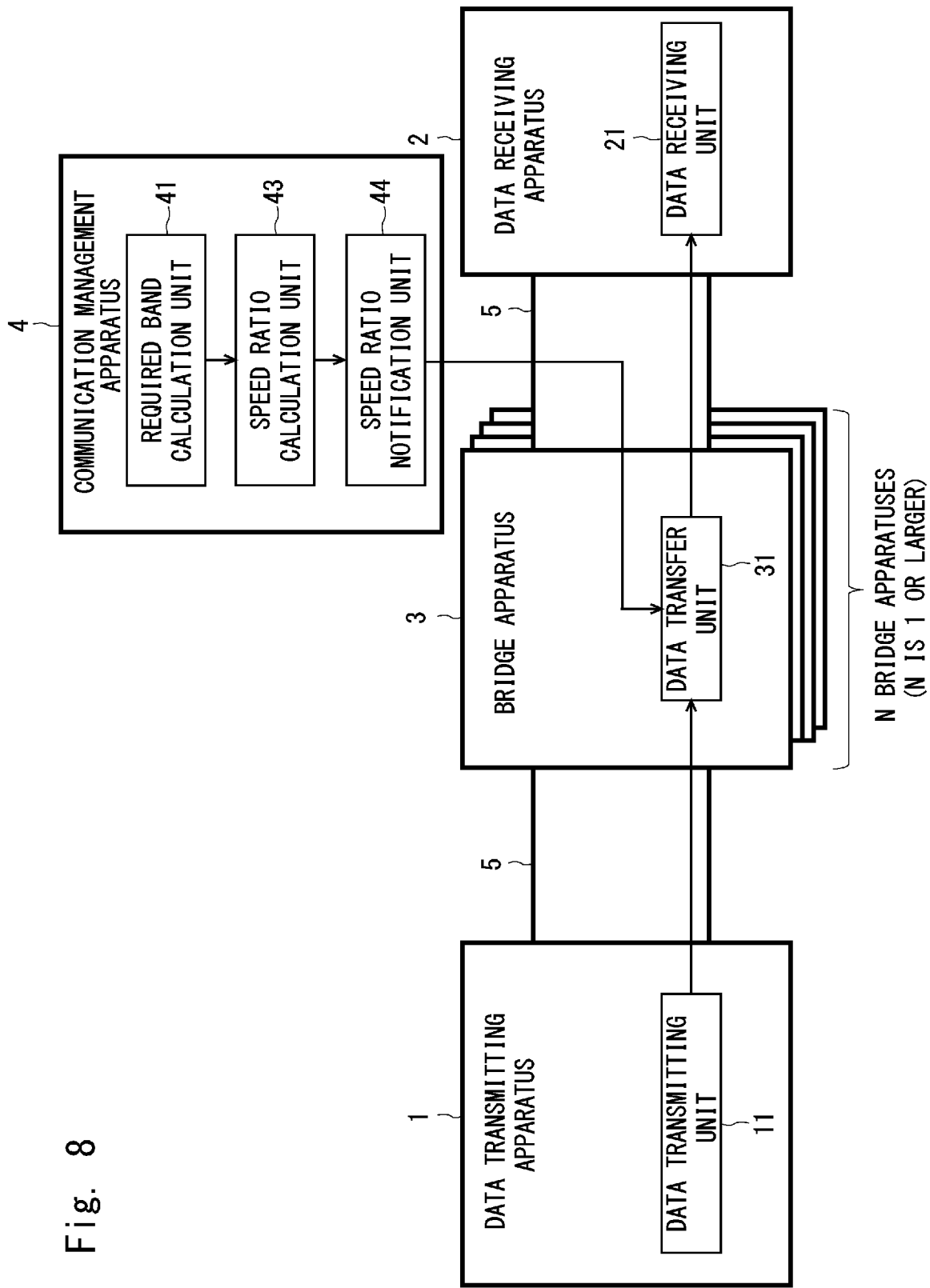
FIG. 8 is a block diagram showing an example of a configuration of a communication system according to a third example embodiment.

Referring to FIG. 8, the communication system according to the third example embodiment differs from the above-described second example embodiment because the speed ratio calculation unit 32 and the required band notification unit 42 are removed from the bridge apparatus 3 and the communication management apparatus 4, respectively, and a speed ratio calculation unit 43 and a speed ratio notification unit 44 are added in the communication management apparatus 4.

The speed ratio calculation unit 43 calculates the relative ratio of communication speeds of a plurality of flows, which the bridge apparatus 3 has received from the data transmitting apparatus 1 and other bridge apparatuses 3, based on required bands for the plurality of flows. The speed ratio notification unit 44 notifies the bridge apparatus 3 of the relative ratio of the communication speeds of the plurality of flows calculated by the speed ratio calculation unit 43.

Note that the third example embodiment has a configuration similar to that of the second example embodiment, except for the above-described configuration.

Next, an example of operations performed by the communication system according to the third example embodiment will be described with reference to FIG. 9.

Figure 9:
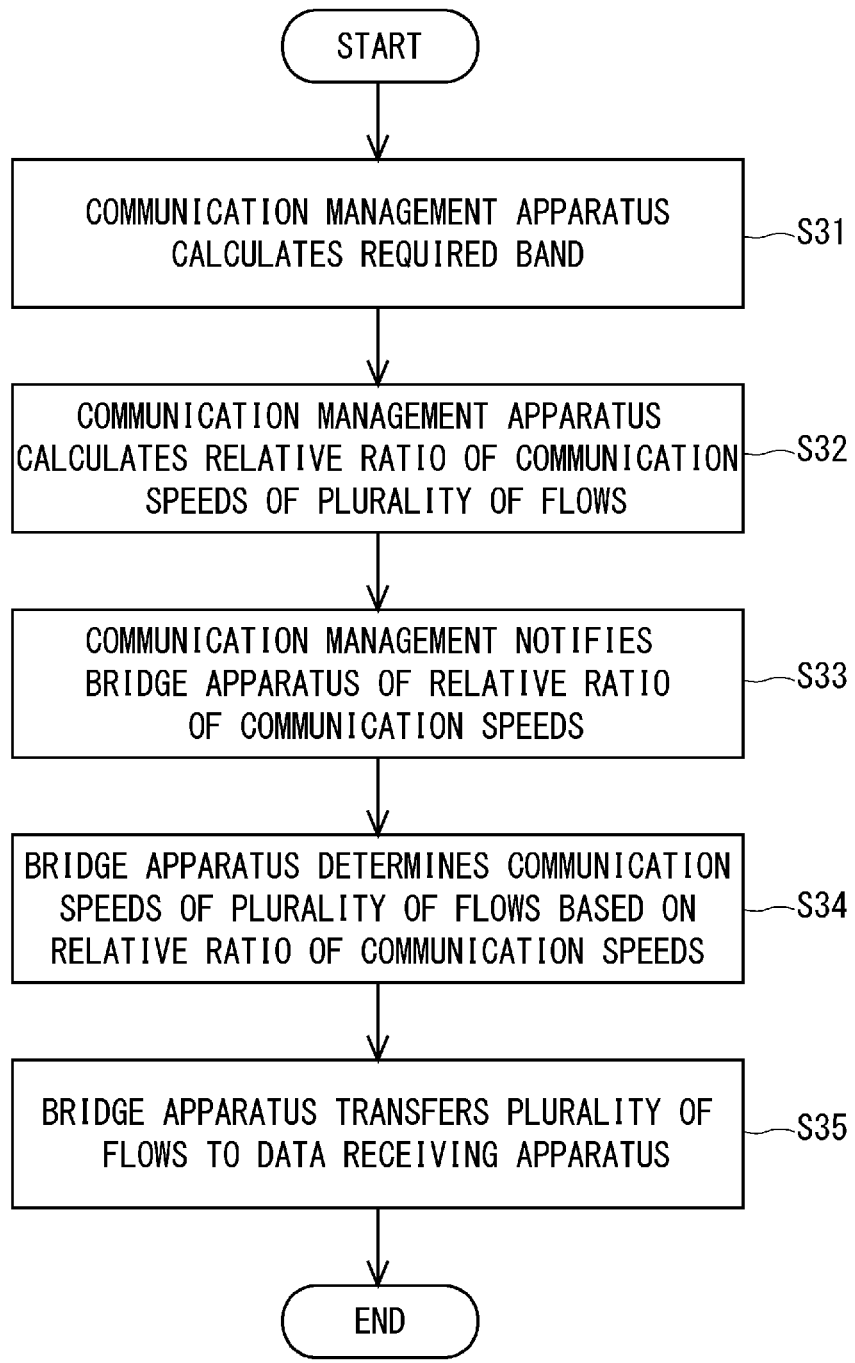
FIG. 9 is a flowchart showing an example of operations performed by the communication system according to the third example embodiment.

Referring to FIG. 9, in the data transmitting apparatus 1, the data transmitting unit 11 transmits flows to the data transfer unit 31 of the bridge apparatus 3.

In the bridge apparatus 3, the data transfer unit 31 receives a plurality of flows from the data transmitting apparatus 1 and other bridge apparatuses 3.

In the communication management apparatus 4, the required band calculation unit 41 calculates required bands for the flows transmitted from the data transmitting unit 11 of the data transmitting apparatus 1 in a manner similar to that of the required band calculation unit 12 of the above-described first example embodiment (S31). The speed ratio calculation unit 43 calculates the relative ratio of communication speeds of the plurality of flows, which the bridge apparatus 3 has received from the data transmitting apparatus 1 and other bridge apparatuses 3, based on required bands for the plurality of flows (S32). The speed ratio notification unit 44 notifies the data transfer unit 31 of the bridge apparatus 3 of the relative ratio of the communication speeds of the plurality of flows calculated by the speed ratio calculation unit 43 (S33).

In the bridge apparatus 3, the data transfer unit 31 determines the communication speeds of the plurality of flows so that the relative ratio of the communication speeds of the plurality of flows is maintained (S34). Then, the data transfer unit 31 transfers the plurality of flows to the data receiving unit 21 of the data receiving apparatus 2 at the determined communication speeds (S35).

In the previously-described second example embodiment, the speed ratio calculation unit 32, which calculates the relative ratio of communication speeds of a plurality of flows, is disposed in the bridge apparatus 3.

In contrast, in the third example embodiment, the speed ratio calculation unit 43, which has a function similar to that of the speed ratio calculation unit 32, is disposed in the communication management apparatus 4. The third example embodiment differs from the second example embodiment only in this point.

Therefore, the third example embodiment provides advantageous effects similar to those of the above-described first and second example embodiments.

Further, in the third example embodiment, since the required band calculation unit 41 and the speed ratio calculation unit 43 are disposed in the communication management apparatus 4, the functions of managing flows and calculating the relative ratio of communication speeds of a plurality of flows can be centralized in the communication management apparatus 4. As a result, it is possible to reduce the hardware resources and the processing time of the bridge apparatus 3.

Fourth Example Embodiment

The configuration itself of the fourth example embodiment is similar to that of one of the above-described first to third example embodiments.

In the fourth example embodiment, when the required band calculation unit 12 or 41 calculates required bands for flows including burst data, it takes an overhead delay that occurs in the transmission/reception of data (data packets) in the bridge apparatus 3 into consideration in the calculation of the required bands.

Note that a band-dependent delay of a flow including burst data is defined as follows.

Bandwidth-Dependent Delay=(Allowable Delay−Overhead Delay)

In the fourth example embodiment, a required band for a flow including burst data is calculated as follows.

Required Bandwidth=Data Size/Bandwidth-Dependent Delay

Note that the overhead delay includes, but is not limited to, at least one of a delay that occurs when the communication path 5 is established, a retransmission delay by an upper-layer protocol, a waiting time until data is sent under the control of the upper-layer protocol, a propagation delay, and a processing delay such as a delay caused by packetization.

The overhead delay can be observed in the data transmitting apparatus 1. Alternatively, the overhead delay can be calculated from information observed (i.e., obtained) in the data transmitting apparatus 1. For example, when the required band calculation unit 41 is disposed in the communication management apparatus 4 as in the case of the above-described second and third example embodiments, the data transmitting apparatus 1 notifies the communication management apparatus 4 of the observed overhead delay.

According to the fourth example embodiment, when the required band calculation unit 12 or 41 calculates required bands for flows including burst data, it takes an overhead delay that occurs in the transmission/reception of data (data packets) in the bridge apparatus 3 into consideration in the calculation of the required bands. Therefore, even when the overhead delay that occurs in the transmission/reception of data (data packets) is, relative to the allowable delay for flows including burst data, too large to be ignored, it is possible to accurately calculate required bands for the flows.

Fifth Example Embodiment

The configuration itself of the fifth example embodiment is similar to that of one of the above-described first to fourth example embodiments.

In the fifth example embodiment, the required band calculation unit 12 or 41 adds a correction amount to a required band calculated for each of a plurality of flows. Further the required band calculation unit 12 or 41 sets the correction amount for each of the plurality of flows in such a manner the larger the allowable delay of the flow is, the smaller the correction amount becomes.

For a flow including burst data, the required band calculation unit 12 or 41 calculates a required band therefor by dividing the data size of the burst data by the allowable delay or the band-dependent delay of the flow. Therefore, the required band for the flow including burst data corresponds to the average data rate defined by the time (i.e., the length) of the allowable delay or the band-dependent delay. Further, for a flow including continuous data (i.e., a flow including no burst data), the required band calculation unit 12 or 41 uses, for example, the average data rate of the continuous data as the required band. However, the data rate of the actual flow fluctuates. Meanwhile, the available band in the communication path 5 also changes. Therefore, data may be accumulated in the bridge apparatus 3, thus raising a risk of the occurrence of an overflow.

Therefore, as described above, the required band calculation unit 12 or 41 adds a correction amount to a required band calculated for each of a plurality of flows, and sets the correction amount for each of the plurality of flows in such a manner the larger the allowable delay of the flow is, the smaller the correction amount becomes. In this way, it is possible to reduce the possibility of an overflow as well as to provide the above-described advantageous effects in the first to fourth example embodiments.

FIG. 10 shows an example of a data size, a frequency of communications, an allowable delay, and the number of flows that can simultaneously occur (when there are a plurality of communication nodes, a plurality of flows can simultaneously occur) for each of two types of traffics A and B (two types of communications) among communications carried out in a factory.

Further, FIG. 11 shows an example of control of ratios of communication speeds of a plurality of flows in the fifth example embodiment, in which a correction amount is added to a required band calculated for each of a plurality of flows according to the allowable delay of the flow. Note that FIG. 11 shows ratios of communication speeds of a plurality of flows in a case where there are two flows of traffics A each of which has a high priority, four flows of traffics B each of which has a high priority, and a group of flows of best-effort traffics which has a low priority. Further, in this example, it is assumed that the required band calculation unit 12 or 41 calculates a required band by dividing a data size by an allowable delay as in the case of the above-described first to third example embodiments.

Referring to FIG. 11, the required band calculation unit 12 or 41 calculates a required band for each of the flows of the traffics A by dividing the data size by the allowable delay, and derives a required band (8.4 Mbps) by adding a correction amount of 5%, which is determined according to the allowable delay, to the calculated required band value. Further, similarly, the required band calculation unit 12 or 41 calculates a required band for each of the flows of the traffics B by dividing the data size by the allowable delay, and derives a required band (5.2 Mbps) by adding a correction amount of 30%, which is determined according to the allowable delay, to the calculated required band value. Note that since the required band for the traffic A is larger than that for the traffic B, the correction amount for the traffic A is set to a smaller value.

Figure 12:
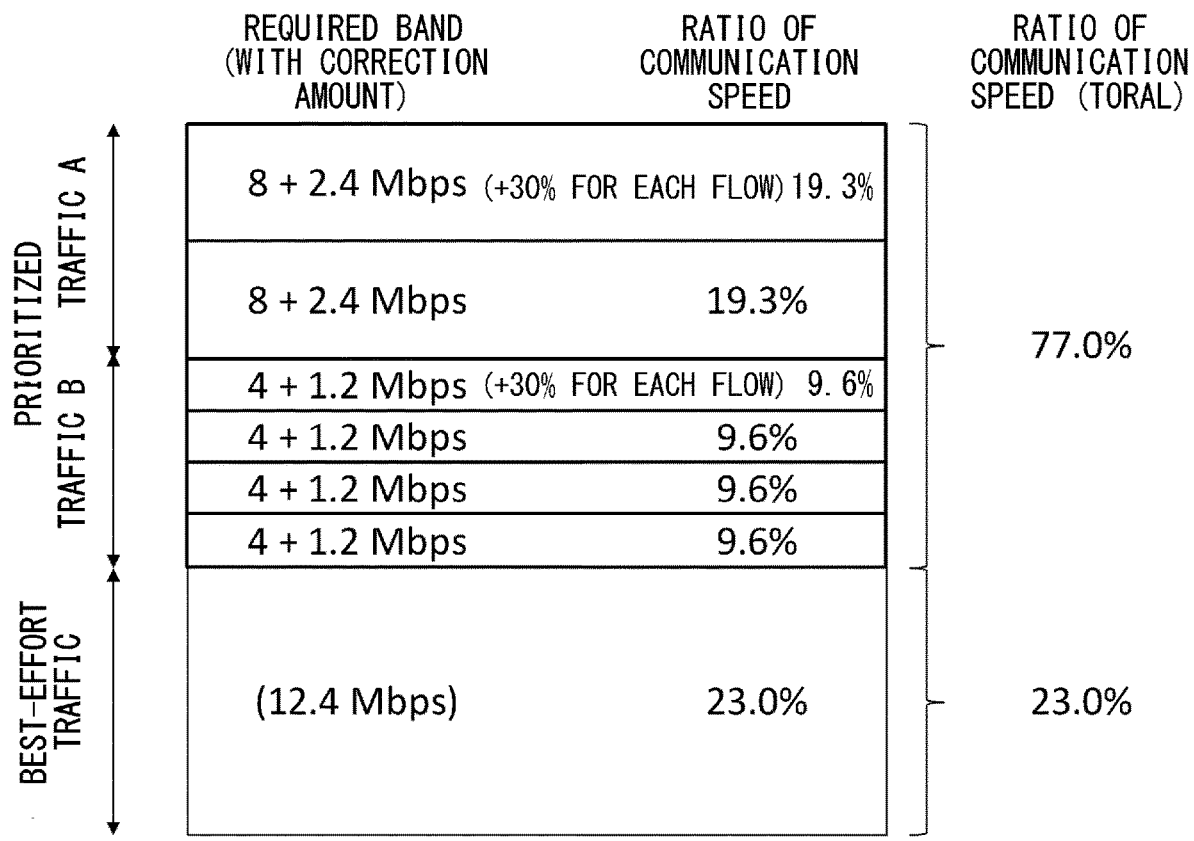
FIG. 12 shows an example of control performed by a communication system according to related art in a case where correction amounts are evenly added to required bands.

Note that, for a comparison purpose, FIG. 12 shows an example of control of ratios of communication speeds of a plurality of flows in related art, in which the same correction amount of 30% is added to a required band calculated for each of a plurality of flows.

Figure 13:
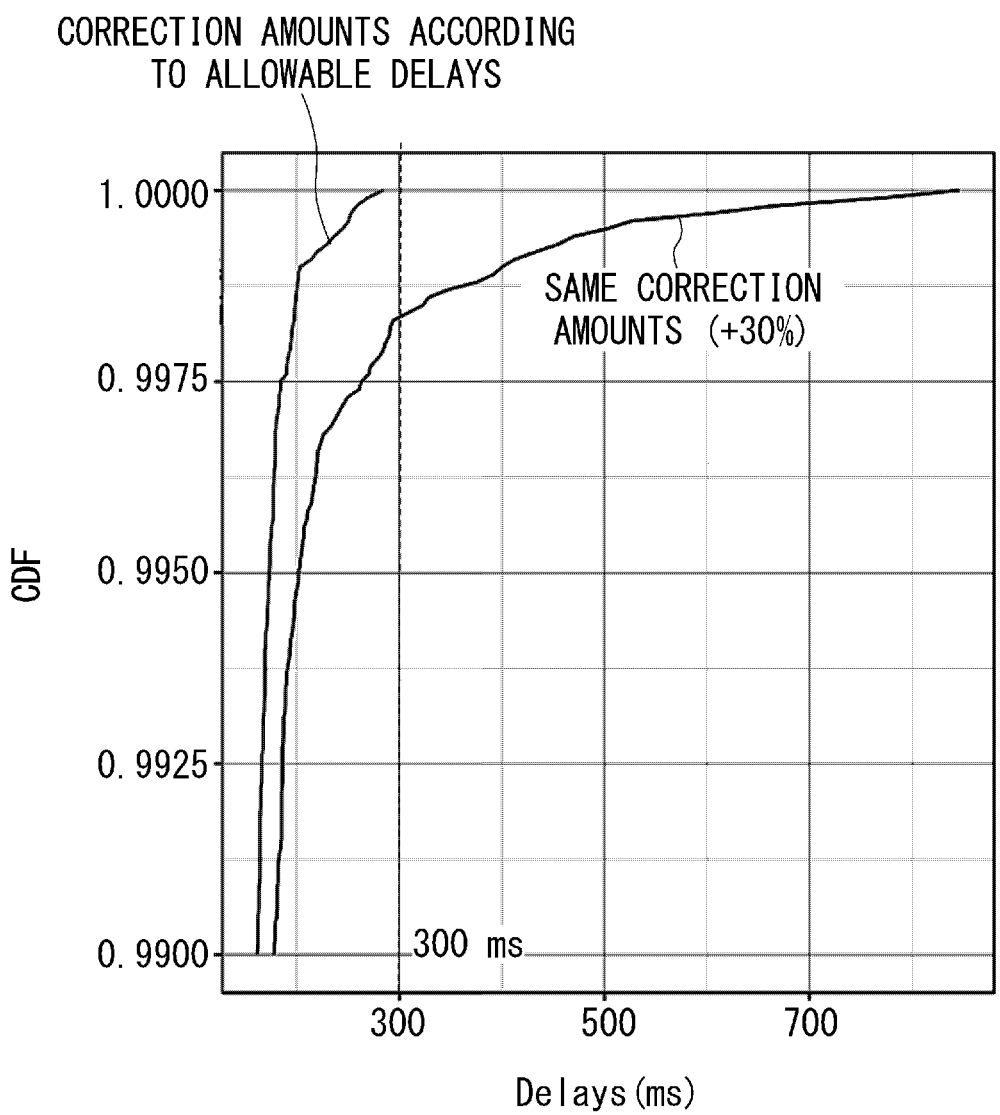
FIG. 13 is a graph for showing an example of a delay in a flow of traffic B by the communication system according to the fifth example embodiment.

FIG. 13 shows an example of a graph in which the delay of the flow of the traffic B is represented by a cumulative distribution function (CDF: Cumulative Distribution Function).

Referring to FIG. 13, when the correction amounts are added according to the allowable delays (best-effort traffic: 16.4 Mbps on average) as shown in FIG. 11, the bridge apparatus 3 transfers the two flows of the traffics A, the four flows of the traffics B, and the group of flows of the best-effort traffics at communication speeds that are determined according to the relative ratios (15.6%×2:9.6%×4: 30.4%) of the respective communication speeds. In this case, when the available band in the communication path 5, which is centered at 30 Mbps, changes by ±20%, the delays of the flows of the traffics B are smaller than 300 msec.

Meanwhile, when the same correction amount of 30% is added (best-effort traffic: 12.4 Mbps on average) as shown in FIG. 12, the bridge apparatus 3 transfers the two flows of the traffics A, the four flows of the traffics B, and the group of flows of the best-effort traffics at communication speeds that are determined according to the relative ratios (19.3%×2: 9.6%×4:23.0%) of the respective communication speeds. In this case, when the available band in the communication path 5 changes as described above, the delay of the flows of the traffics B increases to 700 msec or longer.

Note that the delays of the flows of the traffics A were smaller than the allowable delay (5 sec) in both of the cases shown in FIGS. 11 and 12.

Further, when the correction amount determined according to the allowable delay is added as shown in FIG. 11, the sum total of the ratios of the communication speeds of the flows of the traffics A and B, both of which have a high priority, is 69.6%. In contrast, when the same correction amount is added as shown in FIG. 12, the sum total of the ratios of the communication speeds of the flows of the traffics A and B, both of which have a high priority, is 77.0%. As described above, when the correction amount determined according to the allowable delay was added, although the sum total of the ratios of the communication speeds of the flows of the traffics A and B, both of which have a high priority, was smaller than that when the same amount of correction was added, both of the flows of the traffics A and B were able to be sent to the data receiving apparatus 2 with delays that were within the allowable range.

Sixth Example Embodiment

Next, an example of a configuration of a communication system according to a sixth example embodiment will be described with reference to FIG. 14.

Figure 14:
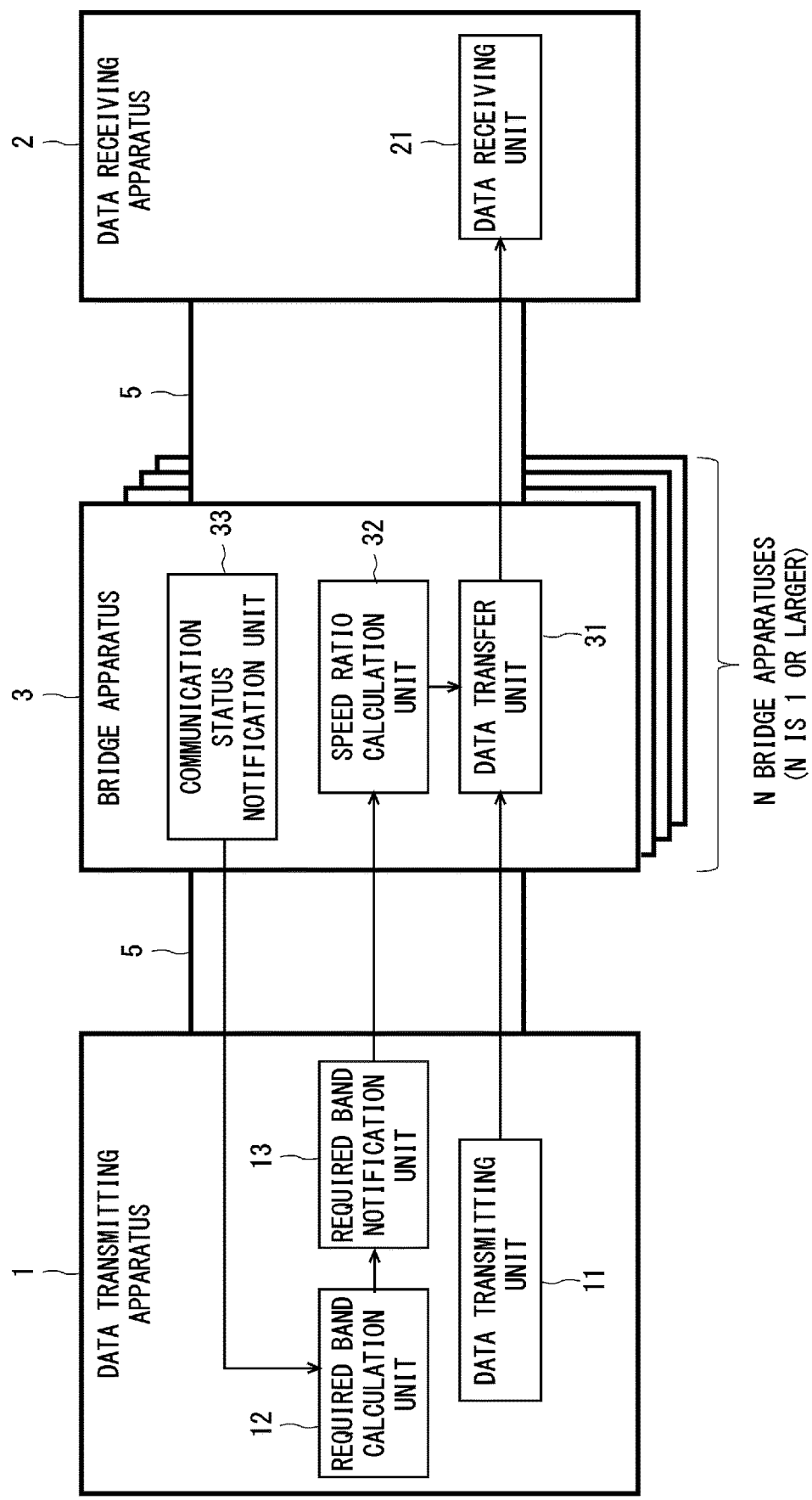
FIG. 14 is a block diagram showing an example of a configuration of a communication system according to a sixth example embodiment.

Referring to FIG. 14, the communication system according to the sixth example embodiment differs from the above-described first example embodiment because a communication status notification unit 33 is added in the bridge apparatus 3. However, the communication system according to the sixth example embodiment is not limited to this example, and may be one that is obtained by adding the communication status notification unit 33 in the bridge apparatus 3 in any of the above-described second to fifth example embodiments.

The communication status notification unit 33 observes a communication status in the communication path 5 and notifies the required band calculation unit 12 or 41 of the observed communication status in the communication path 5.

Note that the communication status in the communication path 5 includes, but is not limited to, at least one of a size of data (a data frame) already transmitted to the data receiving apparatus 2, a transmission speed of data (a data frame) already transmitted to the data receiving apparatus 2, an arrival status of data (a data frame) received from other bridge apparatuses 3 in each layer, and a reception speed of data (a data frame) received from other bridge apparatuses 3.

Further, similarly to the above-described fifth example embodiment, when the required band calculation unit 12 or 41 adds a correction amount to a required band calculated for each of a plurality of flows, it calculates an actual communication speed of the flow at a bottleneck link on the communication path 5 based on the communication status in the communication path 5 of which the required band calculation unit 12 or 41 is notified by the communication status notification unit 33. Then, the required band calculation unit 12 or 41 sets a correction amount in such a manner that the smaller the calculated actual communication speed of the flow is, the larger the correction amount becomes. Then, the required band calculation unit 12 or 41 adds the set correction amount to the required band for the flow.

In this way, in the sixth example embodiment, it is possible to assign a large correction amount to a flow for which communication performance is likely to deteriorate because, for example, the communication path 5 is a wireless network, and to assign a small correction amount to a flow for which communication performance is stable. In this way, it is possible to satisfy communication requirements for a larger number of flows.

Seventh Example Embodiment

The configuration itself of the seventh example embodiment is similar to that of one of the above-described first to sixth example embodiments.

In the seventh example embodiment, when a new flow of data occurs, when the overhead delay in the transmission/reception of data (data packets) in the bridge apparatus 3 changes beyond a predetermined threshold, or when the communication status in the communication path 5 changes beyond a predetermined threshold, the required band calculation unit 12 or 41 recalculates the required bands for the flows based on information that is obtained after the new flow occurs or after the overhead delay or the communication status changes. Further, the speed ratio calculation unit 32 or 43 updates the relative ratio of the communication speeds of a plurality of flows based on the recalculated required bands for the plurality of flows. Then, the data transfer unit 31 transfers the plurality of flows to the data receiving apparatus 2 according to the updated relative ratio of the communication speeds of the plurality of flows.

By doing so, in the seventh example embodiment, it is possible to transfer each flow at an appropriate communication speed even when a new flow of data occurs, or when the overhead delay of the bridge apparatus 3 or the communication status in the communication path 5 changes.

Note that although each of the above-described example embodiments shows an example of one-way communication from the data transmitting apparatus 1 to the data receiving apparatus 2, it is also possible to perform two-way communication by providing equivalent means in the reverse direction. Further, to calculate required bands for flows including burst data, the data size of the burst data and the allowable delays of the flows are required. However, such a data size and an allowable delay are attributes (or properties) of data. Therefore, as a method for acquiring such a data size and an allowable delay, there are, for example, a method in which they are acquired by receiving data, and a method in which they are acquired by registering them in advance in the communication management apparatus 4.

Although the present disclosure is explained above with reference to example embodiments, the present disclosure is not limited to the above-described example embodiments. Various modifications that can be understood by those skilled in the art can be made to the configuration and details of the present disclosure within the scope of the disclosure.

For example, the above-described example embodiments may be used by combining parts or the whole of two or more example embodiments with each other.

Further, although the data transmitting apparatus 1, the data receiving apparatus 2, the bridge apparatus 3, and the communication management apparatus 4 are described as hardware configurations in each of the above-described example embodiments, the present disclosure is not limited to the hardware configurations. In the present disclosure, any of the processes performed by the data transmitting apparatus 1, the data receiving apparatus 2, the bridge apparatus 3, and the communication management apparatus 4 can also be implemented by having a processor, such as a CPU (Central Processing Unit), load a computer program(s) stored in a memory and execute the loaded computer program(s).

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the example embodiments disclosed above can be described as, but not limited to, the following supplementary notes.

(Supplementary Note 1)

A communication system comprising:
at least one data transmitting apparatus;
at least one data receiving apparatus;
at least one bridge apparatus connected to the data transmitting apparatus and the data receiving apparatus through a communication path, and configured to receive a plurality of flows from the data transmitting apparatus and transfer the plurality of flows to the data receiving apparatus;
a required band calculation unit configured to calculate a required band for the plurality of flows, in which, for a flow including burst data among the plurality of flows, the required band calculation unit calculates the required band for the flow based on a data size of the burst data and an allowable delay of the flow; and
a speed ratio calculation unit configured to calculate a relative ratio of communication speeds of the plurality of flows based on the required band for the plurality of flows, wherein
the bridge apparatus transfers the plurality of flows to the data receiving apparatus according to the relative ratio of the communication speeds.

(Supplementary Note 2)

The communication system described in Supplementary note 1, wherein the required band calculation unit calculates the required band for the flow including the burst data by dividing the data size of the burst data by the allowable delay of the flow.

(Supplementary Note 3)

The communication system described in Supplementary note 1 or 2, wherein
the required band calculation unit calculates a band-dependent delay of the flow including the burst data by subtracting an overhead delay occurring in transmission/reception of data in the bridge apparatus from the allowable delay of the flow, and
the required band calculation unit calculates the required band for the flow including the burst data by dividing the data size of the burst data by the allowable delay of the flow.

(Supplementary Note 4)

The communication system described in any one of Supplementary notes 1 to 3, wherein the required band calculation unit adds a correction amount to the required band for each of the plurality of flows, and sets the correction amount to be added to the required band for the flow in such a manner that the larger the allowable delay of the flow is, the smaller the correction amount becomes.

(Supplementary Note 5)

The communication system described in Supplementary note 4, further comprising a communication status notification unit configured to monitor a communication status in the communication path and notify the required band calculation unit of the communication status in the communication path, wherein
the required band calculation unit calculates, for each of the plurality of flows, an actual communication speed of the flow at a bottleneck link on the communication path based on the communication status in the communication path, sets the correction amount to be added to the required band for the flow in such a manner that the smaller the actual communication speed of the flow is, the larger the correction amount becomes, and adds the set correction amount to the required band for the flow.

(Supplementary Note 6)

The communication system described in Supplementary note 5, wherein when a new flow of data occurs, when the overhead delay occurring in transmission/reception of data in the bridge apparatus changes beyond a predetermined threshold, or when the communication status changes beyond a predetermined threshold, the required band calculation unit recalculates the required band for the plurality of flows.

(Supplementary Note 7)

The communication system described in Supplementary note 3 or 6, wherein the overhead delay includes at least one of a delay that occurs when the communication path is established, a retransmission delay by an upper-layer protocol, a waiting time until data is sent under control of the upper-layer protocol, a propagation delay, and a processing delay.

(Supplementary Note 8)

The communication system described in Supplementary note 5 or 6, wherein the communication status in the communication path includes at least one of a size of data already transmitted to the data receiving apparatus, a transmission speed of data already transmitted to the data receiving apparatus, an arrival status of data received from another bridge apparatus in each layer, and a reception speed of data received from another bridge apparatus.

(Supplementary Note 9)

The communication system described in any one of Supplementary notes 1 to 8, wherein
the required band calculation unit is provided in the data transmitting apparatus, and
the speed ratio calculation unit is provided in the bridge apparatus.

(Supplementary Note 10)

The communication system described in any one of Supplementary notes 1 to 8, further comprising a communication management apparatus connected to the bridge apparatus, wherein
the required band calculation unit is provided in the communication management apparatus, and
the speed ratio calculation unit is provided in the bridge apparatus.

(Supplementary Note 11)

The communication system described in any one of Supplementary notes 1 to 8, further comprising a communication management apparatus connected to the bridge apparatus, wherein
the required band calculation unit and the speed ratio calculation unit are provided in the communication management apparatus.

(Supplementary Note 12)

A bridge apparatus connected to at least one data transmitting apparatus and at least one data receiving apparatus through a communication path, and configured to receive a plurality of flows from the data transmitting apparatus and transfer the plurality of flows to the data receiving apparatus, the bridge apparatus comprising:
- a speed ratio calculation unit configured to be notified of a required band for the plurality of flows, and to calculate a relative ratio of communication speeds of the plurality of flows based on the required band for the plurality of flows; and
- a data transfer unit configured to receive the plurality of flows from the data transmitting apparatus and transfer the plurality of flows to the data receiving apparatus according to the relative ratio of the communication speeds, wherein
- the required band for a flow including burst data among the plurality of flows is calculated based on a data size of the burst data and an allowable delay of the flow.

(Supplementary Note 13)

The bridge apparatus described in Supplementary note 12, further comprising a communication status notification unit configured to monitor a communication status in the communication path and notify a required band calculation unit of the communication status in the communication path, the required band calculation unit being configured to calculate a required band for the plurality of flows.

(Supplementary Note 14)

The bridge apparatus described in Supplementary note 13, wherein the communication status in the communication path includes at least one of a size of data already transmitted to the data receiving apparatus, a transmission speed of data already transmitted to the data receiving apparatus, an arrival status of data received from another bridge apparatus in each layer, and a reception speed of data received from another bridge apparatus.

(Supplementary Note 15)

A communication method performed by a communication system comprising: at least one data transmitting apparatus; at least one data receiving apparatus; and at least one bridge apparatus connected to the data transmitting apparatus and the data receiving apparatus through a communication path, and configured to receive a plurality of flows from the data transmitting apparatus and transfer the plurality of flows to the data receiving apparatus, the communication method comprising:
- a step of calculating a required band for the plurality of flows, in which, for a flow including burst data among the plurality of flows, the required band for the flow is calculated based on a data size of the burst data and an allowable delay of the flow;
- a step of calculating a relative ratio of communication speeds of the plurality of flows based on the required band for the plurality of flows; and
- a step of transferring, by the bridge apparatus, the plurality of flows to the data receiving apparatus according to the relative ratio of the communication speeds.

(Supplementary Note 16)

A communication method performed by a bridge apparatus connected to at least one data transmitting apparatus and at least one data receiving apparatus through a communication path, and configured to receive a plurality of flows from the data transmitting apparatus and transfer the plurality of flows to the data receiving apparatus, the communication method comprising:
- a step of being notified of a required band for the plurality of flows, and calculating a relative ratio of communication speeds of the plurality of flows based on the required band for the plurality of flows; and
- a step of receiving the plurality of flows from the data transmitting apparatus and transferring the plurality of flows to the data receiving apparatus according to the relative ratio of the communication speeds, wherein
- the required band for a flow including burst data among the plurality of flows is calculated based on a data size of the burst data and an allowable delay of the flow.

(Supplementary Note 17)

A non-transitory computer readable medium storing a program to be executed by a bridge apparatus connected to at least one data transmitting apparatus and at least one data receiving apparatus through a communication path, and configured to receive a plurality of flows from the data transmitting apparatus and transfer the plurality of flows to the data receiving apparatus, the program comprising:
- a process for being notified of a required band for the plurality of flows, and calculating a relative ratio of communication speeds of the plurality of flows based on the required band for the plurality of flows; and
- a process for receiving the plurality of flows from the data transmitting apparatus and transferring the plurality of flows to the data receiving apparatus according to the relative ratio of the communication speeds, wherein
- the required band for a flow including burst data among the plurality of flows is calculated based on a data size of the burst data and an allowable delay of the flow.

INDUSTRIAL APPLICABILITY

The present disclosure is applicable to uses in facilities such as factories and warehouses in which information detected by various sensors and control messages to robots and the like are transmitted through a wireless network.

Further, the present disclosure is also applicable to uses in infrastructure facilities such as power plants, and hospitals and the like in which information detected by various sensors and emergency messages and the like are transmitted through a wireless network.

This application is based upon and claims the benefit of priority from Japanese patent application No. 2019-166067, filed on Sep. 12, 2019, the disclosure of which is incorporated herein in its entirety by reference.

REFERENCE SIGNS LIST

1 DATA TRANSMITTING APPARATUS
11 DATA TRANSMITTING UNIT
12 REQUIRED BAND CALCULATION UNIT
13 REQUIRED BAND NOTIFICATION UNIT
2 DATA RECEIVING APPARATUS
21 DATA RECEIVING UNIT
3 BRIDGE APPARATUS
31 DATA TRANSFER UNIT
32 SPEED RATIO CALCULATION UNIT
33 COMMUNICATION STATUS NOTIFICATION UNIT
4 COMMUNICATION MANAGEMENT APPARATUS
41 REQUIRED BAND CALCULATION UNIT
42 REQUIRED BAND NOTIFICATION UNIT
43 SPEED RATIO CALCULATION UNIT
44 SPEED RATIO NOTIFICATION UNIT
5 COMMUNICATION PATH

The invention claimed is:

1. A communication system comprising:
at least one data transmitting apparatus comprising at least a memory and a processor;

at least one data receiving apparatus comprising at least a memory and a processor;

at least one bridge apparatus comprising at least a memory and a processor, connected to the data transmitting apparatus and the data receiving apparatus through a communication path, and configured to receive a plurality of flows from the data transmitting apparatus and transfer the plurality of flows to the data receiving apparatus;

wherein the data transmitting apparatus includes a required band calculation unit configured to calculate a required band for the plurality of flows, in which, for a flow including burst data among the plurality of flows, the required band calculation unit calculates the required band for the flow based on a data size of the burst data and an allowable delay of the flow; and wherein the bridge apparatus includes a speed ratio calculation unit configured to calculate a relative ratio of communication speeds of the plurality of flows based on the required band for the plurality of flows, wherein the bridge apparatus transfers the plurality of flows to the data receiving apparatus according to the relative ratio of the communication speeds.

2. The communication system according to claim 1, wherein the required band calculation unit calculates the required band for the flow including the burst data by dividing the data size of the burst data by the allowable delay of the flow.

3. The communication system according to claim 1, wherein the required band calculation unit calculates a band-dependent delay of the flow including the burst data by subtracting an overhead delay occurring in transmission/reception of data in the bridge apparatus from the allowable delay of the flow, and the required band calculation unit calculates the required band for the flow including the burst data by dividing the data size of the burst data by the allowable delay of the flow.

4. The communication system according to claim 3, wherein the overhead delay includes at least one of a delay that occurs when the communication path is established, a retransmission delay by an upper-layer protocol, a waiting time until data is sent under control of the upper-layer protocol, a propagation delay, and a processing delay.

5. The communication system according to claim 1, wherein the required band calculation unit adds a correction amount to the required band for each of the plurality of flows, and sets the correction amount to be added to the required band for the flow in such a manner that the larger the allowable delay of the flow is, the smaller the correction amount becomes.

6. The communication system according to claim 5, further comprising a communication status notification unit configured to monitor a communication status in the communication path and notify the required band calculation unit of the communication status in the communication path, wherein the required band calculation unit calculates, for each of the plurality of flows, an actual communication speed of the flow at a bottleneck link on the communication path based on the communication status in the communication path, sets the correction amount to be added to the required band for the flow in such a manner that the smaller the actual communication speed of the flow is, the larger the correction amount becomes, and adds the set correction amount to the required band for the flow.

7. The communication system according to claim 6, wherein when a new flow of data occurs, when the overhead delay occurring in transmission/reception of data in the bridge apparatus changes beyond a predetermined threshold, or when the communication status changes beyond a predetermined threshold, the required band calculation unit recalculates the required band for the plurality of flows.

8. The communication system according to claim 6, wherein the communication status in the communication path includes at least one of a size of data already transmitted to the data receiving apparatus, a transmission speed of data already transmitted to the data receiving apparatus, an arrival status of data received from another bridge apparatus in each layer, and a reception speed of data received from another bridge apparatus.

9. The communication system according to claim 1, wherein
the required band calculation unit is provided in the data transmitting apparatus, and
the speed ratio calculation unit is provided in the bridge apparatus.

10. The communication system according to claim 1, further comprising a communication management apparatus connected to the bridge apparatus, wherein
the required band calculation unit is provided in the communication management apparatus, and
the speed ratio calculation unit is provided in the bridge apparatus.

11. The communication system according to claim 1, further comprising a communication management apparatus connected to the bridge apparatus, wherein
the required band calculation unit and the speed ratio calculation unit are provided in the communication management apparatus.

12. A bridge apparatus comprising at least a memory and a processor connected to at least one data transmitting apparatus and at least one data receiving apparatus through a communication path, and configured to receive a plurality of flows from the data transmitting apparatus and transfer the plurality of flows to the data receiving apparatus, the bridge apparatus comprising:
a speed ratio calculation unit configured to be notified of a required band for the plurality of flows, and to calculate a relative ratio of communication speeds of the plurality of flows based on the required band for the plurality of flows; and
a data transfer unit configured to receive the plurality of flows from the data transmitting apparatus and transfer the plurality of flows to the data receiving apparatus according to the relative ratio of the communication speeds, wherein
the required band for a flow including burst data among the plurality of flows is calculated based on a data size of the burst data and an allowable delay of the flow.

13. The bridge apparatus according to claim 12, further comprising a communication status notification unit configured to monitor a communication status in the communication path and notify a required band calculation unit of the communication status in the communication path, the required band calculation unit being configured to calculate a required band for the plurality of flows.

14. The bridge apparatus according to claim 13, wherein the communication status in the communication path includes at least one of a size of data already transmitted to the data receiving apparatus, a transmission speed of data already transmitted to the data receiving apparatus, an arrival status of data received from another bridge apparatus in each layer, and a reception speed of data received from another bridge apparatus.

15. A communication method performed by a bridge apparatus connected to at least one data transmitting apparatus and at least one data receiving apparatus through a communication path, and configured to receive a plurality of flows from the data transmitting apparatus and transfer the plurality of flows to the data receiving apparatus, the communication method comprising:
a step of being notified of a required band for the plurality of flows, and calculating a relative ratio of communication speeds of the plurality of flows based on the required band for the plurality of flows; and
a step of receiving the plurality of flows from the data transmitting apparatus and transferring the plurality of flows to the data receiving apparatus according to the relative ratio of the communication speeds, wherein
the required band for a flow including burst data among the plurality of flows is calculated based on a data size of the burst data and an allowable delay of the flow.

* * * * *